Jan. 7, 1947.        K. H. POND        2,413,781
APPARATUS FOR OPERATING MACHINE TOOLS
Filed April 11, 1944        3 Sheets-Sheet 3

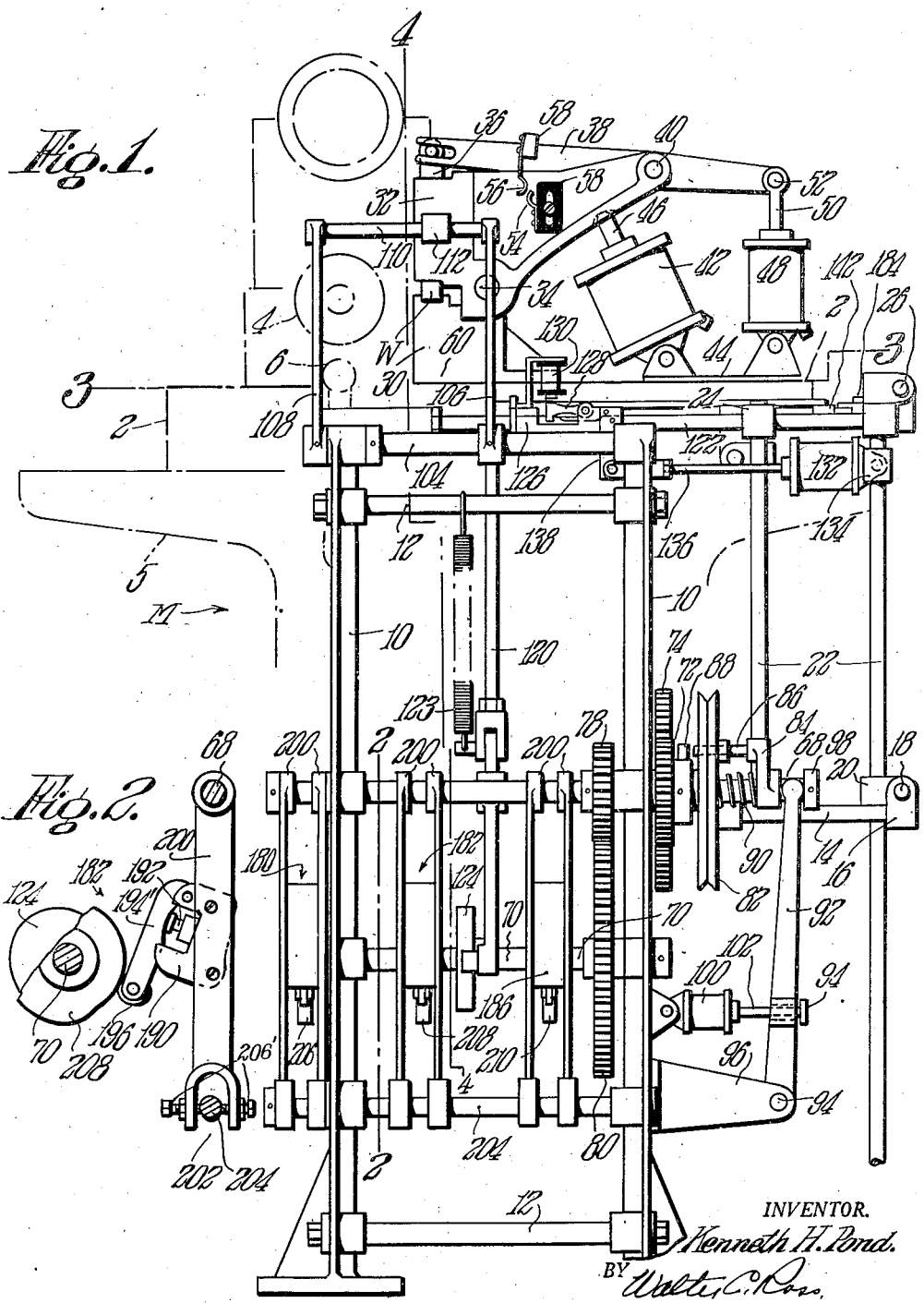

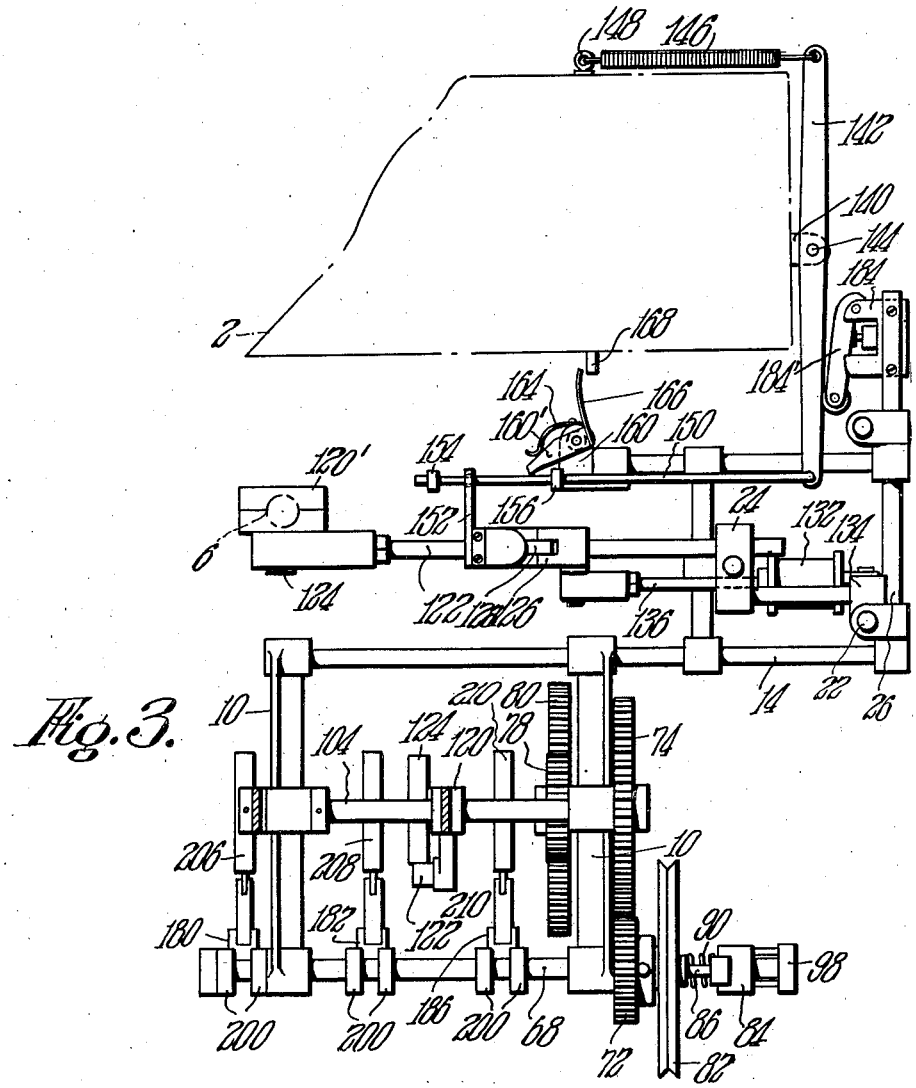

INVENTOR.
Kenneth H. Pond.
BY Walter C. Ross,
Attorney.

Patented Jan. 7, 1947

2,413,781

UNITED STATES PATENT OFFICE 2,413,781

APPARATUS FOR OPERATING MACHINE TOOLS

Kenneth H. Pond, Longmeadow, Mass., assignor to Pond Engineering Company, Springfield, Mass., a corporation of Massachusetts Application April 11, 1944, Serial No. 530,536

7 Claims. (Cl. 90—21)

This invention relates to apparatus for operating machine tools.

The principal objects of the invention are directed to apparatus which is connectable to a machine tool for operating the same. That is operating the same in substantially the same manner as it is operated by an operator.

In this way an apparatus of the invention may be connected to a number of machine tools thereby to make it possible for a single operator to be responsible for a number of machines instead of one as is the common practice.

According to one feature of the invention, the apparatus is of unitary form so as to be self contained and thereby adapted for connection to any machine tool for operating the same. In this way the apparatus may be disconnected from one machine and connected to another at will.

According to another novel feature of the invention the apparatus hereof is adapted for connection to and for the operation of existing machine tools, they not requiring reconstruction since the apparatus is intended to be accommodated to said existing machines.

According to a further novel feature of the invention, the apparatus is automatic in its operation so that pieces of work or objects may be produced successively without the intervention of manual labor.

The apparatus is adapted for broad application wherever it is desired to produce successive operations or objects but is particularly adapted for a machine tool where a tool and work holder are relatively movable to bring the work and tool into engagement for successive machining operations.

While it is not intended to be so limited, the apparatus is well suited for connection to and for the operation of a milling machine. A common form of milling machine has a rotating tool or tools and a table or slide, which may be called a transporting member, that is provided with work holding means. Back and forth movements of the transporting member relative to the tool or tools brings work into engagement with the tool for successive operations or the forming of successive objects. The movements of the transporting member are brought about or initiated by movement of an oscillatable or other movable control member. It is usual with such machines for the operator to place work in and remove it from the holding means and to shift the control member for each cycle of operation.

The apparatus of this invention is constructed and arranged so that when connected to such a machine as described, work is fed to work holding and positioning means associated with the transporting member and the control member is actuated to bring about movements of the said transporting means thereby to bring the tool and work into operative relation for successive operations or to produce successive objects. And means is provided in connection with the apparatus to insure accurate positioning of the work with other safety features contributing to the production of uniform objects or parts or operations.

Various changes and modifications may be made in the form of the apparatus to adapt it for use in connection with various machines therefore it is not desired to be limited to the specific form of the invention which is hereinafter disclosed in the form at present preferred and taken in connection with the accompanying drawings wherein:

Fig. 1 is a front elevational view of apparatus embodying the novel features of the invention;

Fig. 2 is a sectional elevational view on the line 2—2 of Fig. 1;

Fig. 3 is a sectional plan view on the line 3—3 of Fig. 1;

Figure 4:
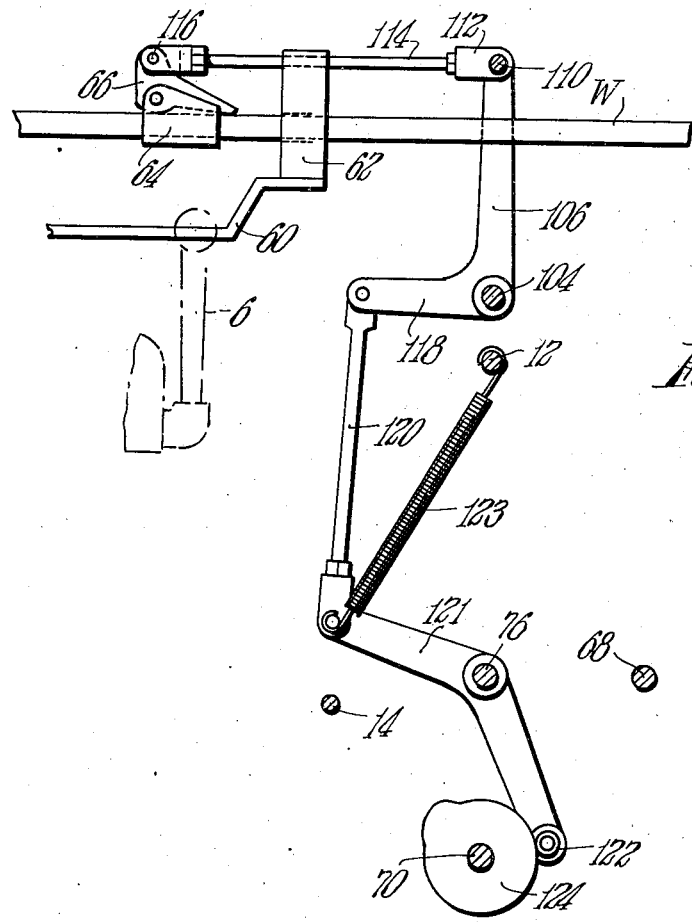
Fig. 4 is a sectional elevational view on the line 4—4 of Fig. 1.
Figure 5:
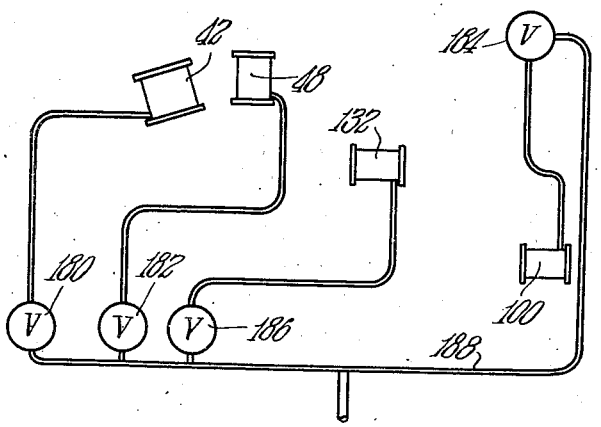
Fig. 5 is a diagrammatic view to explain certain features of the invention.

Referring now to the drawings in detail, the invention will be more fully explained.

Parts of a machine tool M such as a milling machine are represented by dot-dash lines. The table or bed thereof which may be called a transporting member is represented by 2. This supports work holding means and is movable relative to a bed 5 towards and away from a tool 4 which may be a rotatable cutter or cutters. A control member 6 is swingable back and forth to bring about movements of the transporting member 2. The said control member operates to bring about movement of the transporting member forward and back and at the desired speeds or rate of movement.

A supporting structure includes side supports or frame members 10 that are held in spaced relation by rods 12 secured thereto. Also forming a part of the supporting structure there is a horizontal rod or rods 14 fixed in the members 10 to which brackets 16 are fixed that have other horizontal rods 18 fixed therein. Brackets 20 fixed on horizontal rods 18 have vertical rods 22 fixed therein and other brackets 24 on the vertical rods have fixed therein other horizontal rods.

The vertical and horizontal rods together with the brackets provide a strong rigid structure and one which is flexible to accommodate various conditions since the brackets are secured to the rods in any place by means of pins, set screws or the like. The rods and brackets may thus be disposed in any desired relation. The vertical rods or as many as may be desired thereof may extend to the floor for supporting and steadying the structure.

Work holding means adapted to be secured to the transporting member 2 may include a lower member 30 and an upper member 32 pivoted thereto at 34. The upper member swings so as to cooperate with the member 30 for engaging and holding work therebetween or for releasing the same. Work in the illustration of the invention being described consists of a bar of metal W. The end portion of the bar of work W is engaged and disengaged so that it is presented to the tool 4 for successive operations or for the forming of successive objects therefrom.

A locator 36 is movable up and down relative to the member 32 and is arranged to engage the end of the bar W or to be engaged by said bar for locating the end portion of the bar relative to the holding means and tool 4.

A lever 38 is pivoted at 40 to the member 32 and has a slotted end for receiving a pin of the locator 36 as shown. As the said lever 38 swings the locator 36 is moved downwardly to its work locating position and upwardly therefrom.

A cylinder 42 is pivoted to a bracket 44, as shown, and has a piston therein, not shown, which carries a rod 46 engaging member 32. As the piston is operated to move the rod upwardly the member 32 is swung counterclockwise for clamping and holding the bar of work W.

In the form of the invention being described there are other cylinders similar to the cylinder 42 which will be described. These cylinders all have a piston reciprocable therein so that air under pressure admitted to one end or the other will act on the piston and move it in one direction. A spring acting on the piston will move it in an opposite direction. Such will be within the skill of one skilled in the art and need not be further described.

Such a cylinder is shown at 48 and a piston rod 50 thereof is pivotally connected at 52 to lever 38. The rod 50 swings lever 38 counterclockwise for acting on and operating the work locator 36.

Contacts 54 and 56 are carried by insulating blocks 58 associated with members 32 and 38 for a purpose later to be described.

A bracket 60 extends outwardly from the member 30 which has a guide 62 on its outer end. This guide 62 receives the work W for guiding it to the holding means, see Fig. 4. A slide 64 is slidable on the work W and it has a clamp member 66 pivoted thereto that is adapted to frictionally engage the work W as the slide is moved to the left in Fig. 4 and thereby feed the work towards the work holding and locating means. As the slide moves to the right the clamp slides along the work. In this way by successive movements of the slide 64 back and forth the work is fed to the work holding and locating means in a step by step manner.

A drive shaft 68 is rotatable in the frames 10 as is a cam shaft 70. A gear 72 fixed on drive shaft 68 is in mesh with a gear 74 fixed to a shaft 76 journaled in frames 10. Other gears 78 and 80 fixed to the shafts 76 and 70 respectively provide means in conjunction with the gears already described for driving the cam shaft 70 from the drive shaft 68.

A pulley 82 loose on drive shaft 68 may be of any form and operably connected to any suitable source of power. A gear or sprocket may be substituted for the pulley and connected to a source of power.

A clutch member 84 is slidable on the shaft 68 and carries a pin 86 passing through drive member 82 for engaging a pin 88 on gear 72. A spring 90 normally urges the clutch member away from pulley 82.

A lever 92 is pivoted at 94 to a bracket 96 and has a forked upper end engaging the clutch member 84. A collar 98 on the shaft 68 serves as an abutment for said lever 92. When said lever 92 is swung counterclockwise the member 84 is moved to the left whereby members 86 and 88 are engaged so that gear 72 is rotated by member 82 to bring about rotation of the cam shaft 70.

A cylinder 100 pivoted to the frame is of the type already described and it has a rod 102 which passes through lever 92 with a collar 94 on its end. Movement of the rod 102 to the left brings about swinging of the lever 92 as described for engaging the clutching members 86 and 88.

A rock shaft 104 in the upper ends of the frames 12 is provided on which an inner lever 106 is fixed. An outer lever 108 is also fixed to said shaft 104. A rod 110 extends between and is fixed to the upper ends of levers 108 and 106 on which a member 112 is slidable.

A rod 114 connected to member 112 extends through guide 62 and its end is connected at 116 to clamp 66, previously described (see Fig. 4).

An arm 118 of lever 106 is connected by a rod 120 to the upper end of a lever 121 which is journalled on shaft 76. The lower end of lever 121 carries a roll 122 in engagement with a cam 124 fixed on cam shaft 70.

As cam shaft 70 rotates in each cycle of operation of the apparatus the mechanism described operates to feed the work W forwardly a certain distance. The member 112 slides back and forth on the rod 110 as the transporting member 2 moves back and forth towards and away from the tool 4.

A spring 123 extends between member 12 and pivotal connection of the rod 120 and lever 121 to yieldingly hold cam roll 122 on its cam.

A clamp 120' is adapted to be secured to the control lever 6. A connecting rod 122 has one end connected at 124 to the clamp 120' and its other end is slidable in a bracket 24. A slide 126 is slidable on the rod 122 and it has a pawl 128 pivoted thereto for engaging a notch in rod 122, as shown in Fig. 1. A magnet 130 is carried by the slide which when energized moves the pawl upwardly.

A cylinder 132 is pivoted to a bracket 134 fixed to a rod 22 and the end of rod 136 thereof is connected to a plate 138 affixed to said slide 126. As rod 136 is moved to the left in Fig. 1, the slide 126 is moved so that with pawl 128 in the notch of rod 122 the control member 6 is actuated.

A bracket 140 is adapted to be secured to the transporting member 2 and it has a lever 142 pivoted therein at 144. A spring 146 connected at one end to the lever 142 and at its other end to an eye 148 adapted for attachment to the transporting member 2 urges the lever in a counterclockwise direction.

A rod 150 pivoted at one end to the lever 142 is in slidable engagement with a plate 152 carried by slide 126 and has adjustable thereon spaced collars 154 and 156.

A pawl 160' swingable on a bracket member 160 is spring pressed towards the rod 150 by a spring 164 secured to bracket 160 and it has an outwardly extending yieldable springlike member 166 which is engageable by a stud 168 adapted to be affixed to the transporting member 2.

The cylinders 42, 48, 100 and 132 are connected by suitable conduits to valves 180, 182, 184 and 186 which valves are supplied with air from a suitable source by means of a conduit 188.

The valves referred to may take any form desired but in the form of the invention being disclosed they are what may be called three-way valves. These valves include a body 190, see Fig. 2, in which a closure member or disc on a stem 192 moves towards and away from a seat. When the disc is away from the seat the valve passes air to the cylinder to which it is connected.

A lever 194' pivoted to the body carries a roll 196. As the lever 194' swings toward the body the stem is pressed inwardly to move the disc from off its seat and air passes through the valve to the cylinder. A spring in the valve urges the disc onto its seat so that as the lever swings outwardly from the body the disc engages its seat to stop the flow of air to the cylinder. The valve is provided with vent means so that when the disc is on its seat, pressure between the valve and its cylinder is relieved whereby the piston and its rod may be returned to its inoperative position.

Each of the valves 180, 182 and 186 are affixed to pairs of levers such as 200. These levers 200 are swingable at upper ends on the main drive shaft 68 while their lower ends are forked at 202 to straddle a rod 204 fixed in frame members 10. Adjusting screws 206' in the forked ends of the members 200 engage opposite sides of the rod 204 so that the lower ends of the levers 200 may be moved back and forth to adjust the position of the valves and their levers, such as 194, relative to cams 206, 208 and 210 which are fixed on cam shaft 70.

The cams referred to are so constructed and related as to operate their respective valves in the desired timed relation.

The valve 184 for cylinder 100 is supported by rod 26 and its lever 184' is engaged for operation of the valve by lever 142.

In operation the machine tool is put in operation and drive member 82 is continuously rotated. That is the tool 4 of the machine tool is rotated while the mechanism of the machine tool is set in operation and back and forth movements of the transporting member 2 are under the control of control member 6.

The transporting member 2 in its rearward position causes lever 142 to actuate valve 184 so that air is supplied the clutch operating cylinder 100. Said cylinder in its operation brings about swinging of lever 92 so that member 84 is moved inwardly to engage 86 and 88. With drive member 82 being in continuous rotation the cam shaft 70 through gears 72, 74 and 78, 80 is now rotated whereby the several cams perform their functions. The member 32 releasing the work W the cams 206 and 208 are operated so that valves 180 and 182 admit air to cylinders 42 and 48. Previously cam 124 acts on lever 121 and through rod 120 and lever 106 the slide 64 moves forwardly on the work W with member 66 engaging it to advance the bar towards the holding means.

The locator 36 is operated so as to be engaged by the end portion of the work bar W or to engage said bar and position it relative to the holding means and tool subsequent to which the member 32 is caused to clamp the work between it and member 30 whereby the work W is held for the machining operation as transporting member 2 carries the work to the tool.

Valve 186 is operated by cam 210 so that air is admitted to cylinder 132 the rod 136 of which moves the slide 126 that acts on the control member 6. Said control member in its movement brings about movement of the transporting member at the desired speed to present the work to the tool for the machining operation. It will be understood that in order for the slide to move the rod 122, the pawl 128 must be in the notch of said rod.

The contacts 54 and 56 associated with members 32 and 38 are in a circuit including the magnet 130 and a suitable source of energy and function for the following purpose.

As the lever 38 swings to carry the contact 56 downwardly as it does when the positioner is moved downwardly said contact strikes and passes the contact 54. However, should movement of the positioner 36 downwardly be interfered with by jamming of the work or should it for some reason be impossible for the positioner to make a complete stroke, the lever 38 is stopped so that contacts 54 and 56 are engaged whereby the magnet 130 is energized to pull pawl 128 upwardly. Then slide 126 moves forwardly without moving said rod 122. In this way control lever 6 is not actuated and the transporting member 2 is not moved forwardly to present improperly located work to the tool.

Normally in each cycle of operation the rod 122 is moved by the pawl 128 so that control member 6 is actuated for bringing about movement of the transporting member 2 and as the said member 2 moves forwardly the lever 142 moves away from the lever 184' of the valve 184 whereupon said valve is closed and spring 90 moves clutch member 84 to disengage members 86 and 88. This stops rotation of the cam shaft 68.

Each time the transporting member reaches its rear position the lever 184' of valve 184 is operated so that the cam shaft is operated for operating the various units as before described and as the transporting member moves forwardly the cam shaft is stopped.

In this way in each cycle of operation the cam shaft is rotated and then stopped.

It will be noted that the slide 126 operates the rod 122 and thereby control lever 6 only when the positioner 36 is able to perform its function.

In the event the member 36 is unable to function properly and for that reason slide 126 does not operate control member 6 the transporting member 2 remains in its rear position so that lever 142 would be held open and the cam shaft 70 would continue to operate.

To prevent continued rotation of the cam shaft when the transporting member 2 remains in its rear position the rod 150 and plate 152 come into play in the following manner:

As the slide 126 moves forwardly the plate 152 thereof engages collar 154 of rod 150 which is connected to lever 142 and moves said rod 150 forwardly to swing the lever 142 so that it releases the lever 184' of valve 184 allowing it to close. Also the movement of the rod brings collar 156 thereof forwardly of the free end of the pawl 160' which pawl holds the rod 150 against rearward movement and thereby lever 140 is held, against spring 146, from engaging valve lever 184'.

Normally the stud 168 on the transporting member in its forward and rearward movements flexes the spring 166 of the pawl and is arranged to move pawl 160' out of the way of the collar 156 on rearward movement. When the transporting member is stationary in its rear position the pawl is allowed to function for the purpose described.

The valves and their cams may be arranged relatively to bring about any desired sequence of operations during a cycle of operation, the foregoing being intended for purpose of disclosure.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. The combination of a machine tool having a rotatable tool and slide movable towards and away therefrom with a swingable slide control lever therefor and work positioning and holding means on said slide having actuating means therefor with separate unitary operating mechanism therefor comprising, a frame construction, operating means for said control lever, a drive shaft rotatable in said frame construction, connections between said drive shaft and said operating means, a driving member rotatable on said drive shaft, clutch mechanism for engaging said drive shaft and driving member, and operating means for operating said clutch mechanism operable by the said slide.

2. The combination of a machine tool having a rotatable tool and slide movable towards and away therefrom with a swingable slide control lever therefor and work positioning and holding means on said slide having actuating means therefor with separate unitary operating mechanism therefor comprising, a frame construction, operating means for said control lever including disengageable connections, a drive shaft rotatable in said frame construction, connections between said drive shaft and said operating means, a driving member rotatable on said drive shaft, clutch mechanism for engaging said drive shaft and driving member, operating means for said clutch mechanism operable by said slide as it moves in one direction, and means actuated by the work holding and positioning means for disengaging the disengageable connections.

3. The combination of a machine tool having a rotatable tool and slide movable towards and away therefrom with a swingable slide control lever therefor and work positioning and holding means on said slide having actuating means therefor with separate unitary operating mechanism therefor comprising, a frame construction, operating means for said control lever, a drive shaft rotatable in said frame construction, connections between said drive shaft and said operating means, a driving member rotatable on said drive shaft, clutch mechanism for engaging said drive shaft and driving member, and operating means for operating said clutch mechanism operable by the said slide, each of said operating means including a cylinder and conduits connected to said cylinders having cam operated valve means therefor.

4. The combination of a machine tool having a rotatable tool and slide movable towards and away therefrom with a swingable slide control lever therefor and work positioning and holding means on said slide having actuating means therefor with separate unitary operating mechanism therefor comprising, a frame construction, operating means for said control lever, a drive shaft rotatable in said frame construction, connections between said drive shaft and said operating means, a driving member rotatable on said drive shaft, clutch mechanism for engaging said drive shaft and driving member, and operating means for operating said clutch mechanism operable by the said slide, said clutch mechanism and operating means therefor constructed for clutching operation as the slide moves in one direction and arranged for one cycle of operation of the said drive shaft for each said movement of said slide.

5. The combination of a machine tool having a rotatable tool and slide movable towards and away therefrom with a swingable slide control lever therefor and work positioning and holding means on said slide having actuating means therefor with separate unitary operating mechanism therefor comprising, a frame construction, operating means for said control lever including disengageable connections, a drive shaft rotatable in said frame construction, connections between said drive shaft and said operating means, a driving member rotatable on said drive shaft, clutch mechanism for engaging said drive shaft and driving member, operating means for said clutch mechanism operable by said slide as it moves in one direction, and means actuated by the work holding and positioning means for disengaging the disengageable connections, said disengageable connections including a rod secured to said lever having a member slidable thereon which is provided with a pawl engageable with a notch provided in said rod and the means for engaging and disengaging said connections including a magnet operably related to said pawl.

6. The combination of a machine tool having a rotatable tool and slide movable towards and away therefrom with a swingable slide control lever therefor and work positioning and holding means on said slide having actuating means therefor with separate unitary operating mechanism therefor comprising, a frame construction, operating means for said control lever including disengageable connections, a drive shaft rotatable in said frame construction, connections between said drive shaft and said operating means, a driving member rotatable on said drive shaft, clutch mechanism for engaging said drive shaft and driving member, operating means for said clutch mechanism operable by said slide as it moves in one direction, and means actuated by the work holding and positioning means for disengaging the disengageable connections, said clutch mechanism and operating means therefor constructed and arranged whereby said drive shaft and driving member are engaged for operation of said shaft through one cycle of operation for each movement of the slide in said one direction and said disengageable connections arranged for disengagement as the said slide moves in an opposite direction.

7. The combination of a machine tool having a rotatable tool and slide movable towards and away therefrom with a swingable slide control lever therefor and work positioning and holding means on said slide having actuating means therefor with separate unitary operating mechanism therefor comprising, a frame construction, a drive shaft rotatable in said frame construction having a drive member rotatable thereon, clutch means for engaging said shaft and member and operative connections between said slide and clutch means operable as said slide moves in one direction whereby said shaft is rotated through the clutch mechanism for one cycle of operation, connections between said drive shaft and control lever whereby said lever may be operated as the slide moves in one direction, disengageable means in said connections, and means connecting said work positioning means and disengageable means whereby the latter may be disengaged by the former so that the control lever is not operated as the slide moves in said one direction.

KENNETH H. POND.